(12) United States Patent
Snowball et al.

(10) Patent No.: US 10,051,152 B1
(45) Date of Patent: Aug. 14, 2018

(54) APPARATUS AND METHOD FOR VISUALIZATION OF AUTOMATED PAPER SIZE AND SCALING SELECTION

(71) Applicant: Xerox Corporation, Norwalk, CT (US)

(72) Inventors: David Snowball, Sandy (GB); Noah Ullmann, Rochester, NY (US); Michael D. Sprague, Macedon, NY (US); Timothy D. Thomas, Fairport, NY (US); Paul Roberts Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/611,043

(22) Filed: Jun. 1, 2017

(51) Int. Cl.
  *H04N 1/393* (2006.01)
  *H04N 1/00* (2006.01)
  *H04N 1/23* (2006.01)

(52) U.S. Cl.
  CPC ......... *H04N 1/393* (2013.01); *H04N 1/00411* (2013.01); *H04N 1/00427* (2013.01); *H04N 1/00453* (2013.01); *H04N 1/00458* (2013.01); *H04N 1/00466* (2013.01); *H04N 1/00482* (2013.01); *H04N 1/2323* (2013.01); *H04N 2201/0094* (2013.01)

(58) Field of Classification Search
  CPC ........ H04N 1/393; H04N 1/2323; H04N 1/23; H04N 1/00458; H04N 1/00; H04N 1/00427; H04N 1/00466; H04N 1/00453; H04N 1/00482; H04N 1/00411; H04N 2201/0094
  See application file for complete search history.

(56) References Cited

U.S. PATENT DOCUMENTS

| | | | |
|---|---|---|---|
| 2009/0021772 A1* | 1/2009 | Salgado | G06F 3/1205 358/1.15 |
| 2009/0224467 A1 | 9/2009 | Mori | |
| 2011/0267640 A1* | 11/2011 | Takahashi | G06F 3/1204 358/1.15 |
| 2012/0314229 A1 | 12/2012 | Conlon | |
| 2012/0314230 A1 | 12/2012 | Conlon | |
| 2013/0107313 A1 | 5/2013 | Kirby et al. | |
| 2013/0235399 A1 | 9/2013 | Conlon | |
| 2013/0235400 A1 | 9/2013 | Conlon | |
| 2013/0242322 A1 | 9/2013 | Conlon | |
| 2013/0250313 A1 | 9/2013 | Conlon | |
| 2013/0265591 A1 | 10/2013 | Conlon | |
| 2013/0301061 A1 | 11/2013 | Conlon | |
| 2014/0331094 A1 | 11/2014 | Enomoto et al. | |
| 2016/0342590 A1* | 11/2016 | Paulin | G06F 17/30011 |
| 2016/0350043 A1 | 12/2016 | Hikosaka | |
| 2017/0024169 A1 | 1/2017 | Snowball | |

* cited by examiner

*Primary Examiner* — Frantz Bataille
(74) *Attorney, Agent, or Firm* — Fay Sharpe LLP

(57) ABSTRACT

A method and system assist a user in selecting a print option for rendering an image. A database includes print options for rendering images on different sizes of print media. At least some of the print options include different levels of scaling of the image. Features of an image to be rendered are identified. Based on the identified features, at least one of the following is performed: filtering the print options and ranking the print options in the database, to identify a subset of candidate print options from the database of print options. A graphical user interface is generated for displaying representations of at least some of the candidate print options. The graphical user interface is displayed to a user on a display device, whereby a user is able to select a print option for rendering the image.

20 Claims, 13 Drawing Sheets

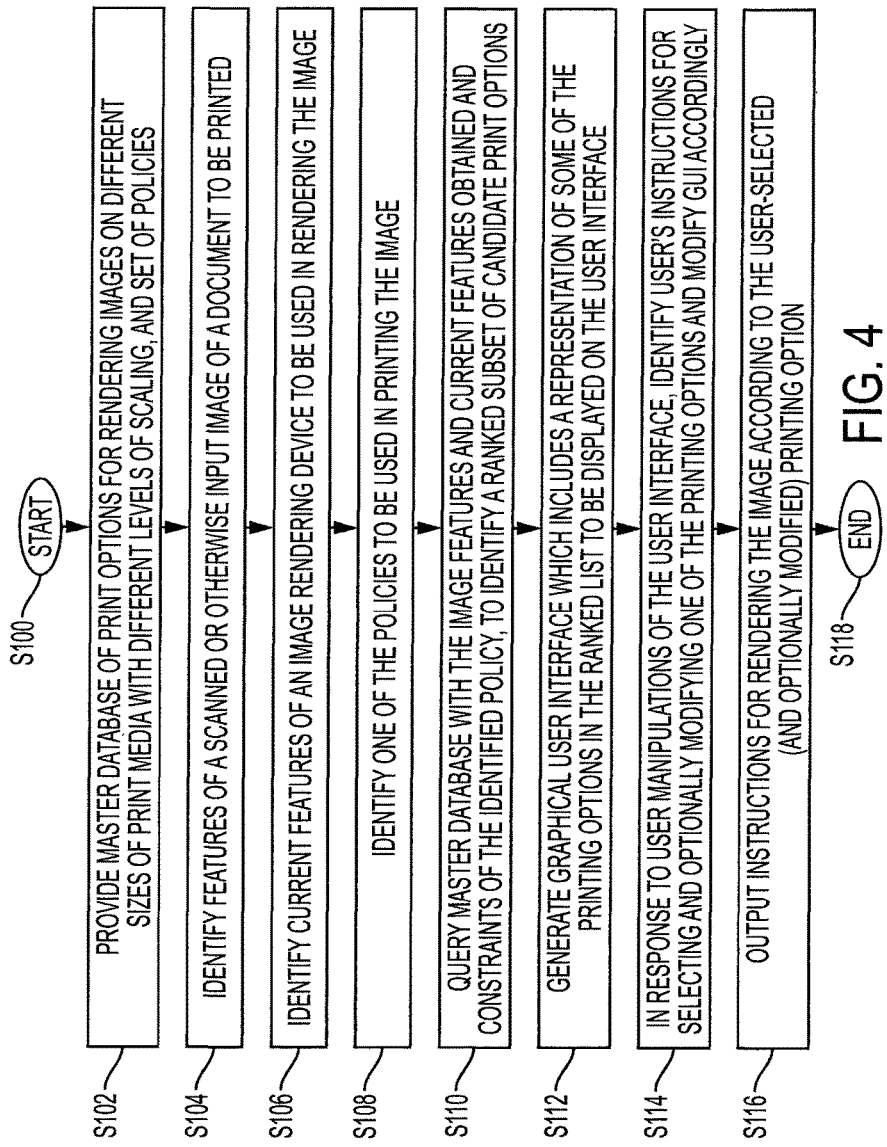

| ID | Name | TrayName | MeasurementUnitID | SizeName | Feed | ShortEdge | LongEdge |
|---|---|---|---|---|---|---|---|
| 5 | Spy70 | Tray 1 (Nw) | 2 | Letter (8.5 x 11") | LEF | 215.9 | 279.4 |
| 5 | Spy70 | Tray 1 (Nw) | 2 | Letter (8.5 x 11") | SEF | 215.9 | 279.4 |
| 5 | Spy70 | Tray 1 (Nw) | 2 | Legal (8.5 x 14") | SEF | 215.9 | 355.6 |
| 5 | Spy70 | Tray 1 (Nw) | 2 | Tabloid (11 x 17") | SEF | 279.4 | 431.8 |
| 5 | Spy70 | Tray 1 (Nw) | 2 | Statement (5.5 x 8.5") | SEF | 139.7 | 215.9 |
| 5 | Spy70 | Tray 1 (Nw) | 2 | Executive (7.25 x 10.5") | LEF | 184.15 | 266.7 |
| 5 | Spy70 | Tray 1 (Nw) | 2 | Executive (7.25 x 10.5") | SEF | 184.15 | 266.7 |
| 5 | Spy70 | Tray 1 (Nw) | 2 | 8 x 10" | LEF | 203.2 | 254 |
| 5 | Spy70 | Tray 1 (Nw) | 2 | 8 x 10" | SEF | 203.2 | 254 |
| 5 | Spy70 | Tray 1 (Nw) | 2 | 8.5 x 13" | SEF | 215.9 | 330.2 |
| 5 | Spy70 | Tray 1 (Nw) | 2 | 8.5 x 13.4" | SEF | 215.9 | 340.36 |
| 5 | Spy70 | Tray 1 (Nw) | 2 | 9 x 11" | SEF | 228.6 | 279.4 |
| 5 | Spy70 | Tray 1 (Nw) Env | 2 | Envelope (6 x 9") | LEF | 152.4 | 228.6 |
| 5 | Spy70 | Tray 1 (Nw) Env | 2 | Monarch Envelope (3.9 x 7.5") | LEF | 98.425 | 190.5 |
| 5 | Spy70 | Tray 1 (Nw) Env | 2 | No. 10 Envelope (4.1 x 9.5") | LEF | 104.775 | 241.3 |

FIG. 16

APPARATUS AND METHOD FOR VISUALIZATION OF AUTOMATED PAPER SIZE AND SCALING SELECTION

BACKGROUND

The exemplary embodiment relates to selection of media size and scaling in image rendering and find particular application in an apparatus and method for assisting a user to select suitable media and scaling for a print job.

Image rendering devices such as printers and multifunction devices (MFDs) often incorporate automatic features for selection of print media and scaling, known as Auto Paper Selection (APS) and Auto Reduce/Enlarge (ARE) for performing copy jobs. The APS feature selects a suitable paper size for printing, based on the size of the image to be printed. This generally entails selecting the next largest paper size if the image size does not exactly match one of the default paper sizes available. The ARE feature automatically reduces or enlarges the image to be printed to fit a given paper size. The APS and ARE features are mutually exclusive and are also constrictive in their application. APS is generally limited to default media types and colors and can give unexpected results for cases where an exact match is not found. ARE only scales from image size to a selected output size. The algorithms are also generally implicit, and the outcome may not be what the user would like (e.g., rotating a non-standard image or scaling it to undesirable levels). This lack of visibility into the underlying selection process often requires trial and error by the user to manually select the desired features, wasting user time and paper.

There remains a need for a system and method for assisting a user in selection of a combination of paper and reduce/enlarge features without the need for rendering multiple prints of candidate combinations to identify a suitable one.

INCORPORATION BY REFERENCE

The following references, the disclosures of which are incorporated in their entireties by reference, relate generally to image forming systems and user interfaces therefor:

U.S. Pub. No. 20090021772, published Jan. 22, 2009, entitled PRINTER DRIVER INTERFACE AND METHODS, by David Salgado, et al.

U.S. Pub. No. 20090224467, published Sep. 10, 2009, entitled PRINTING SYSTEM, CONTROL METHOD THEREOF, AND PRINTING APPARATUS, by Junichi Mori.

U.S. Pub. No. 20130107313, published May 2, 2013, entitled EVALUATING AND MANAGING IMAGE QUALITY PERFORMANCE AND IMPROVING SERVICE EFFECTIVENESS OF GROUPS OF PRODUCTION PRINTERS, by Michael Philip Kirby, et al.

U.S. Pub. No. 20130235399, published Sep. 12, 2013, entitled SYSTEMS AND METHODS FOR EMPLOYING DECLARATIVE PROGRAMMING TO OPTIMIZE DYNAMIC OPERATIONS IN COMPLEX IMAGE FORMING AND MEDIA HANDLING DEVICES, by Paul Roberts Conlon.

U.S. Pub. No. 20130235400, published Sep. 12, 2013, entitled SYSTEMS AND METHODS FOR PRESENTING ORIENTATION FLOW GRAPHS IN THREE DIMENSIONS IN COMPLEX DOCUMENT HANDLING AND IMAGE FORMING DEVICES, by Paul Roberts Conlon.

U.S. Pub. No. 20130242322, published Sep. 19, 2013, entitled SYSTEMS AND METHODS FOR IMPLEMENTING USER-CUSTOMIZABLE OPERABILITY FOR IMAGING OPERATIONS IN IMAGE FORMING DEVICES, by Paul Roberts Conlon.

U.S. Pub. No. 20130250313, published Sep. 26, 2013, entitled SYSTEMS AND METHODS FOR IMPLEMENTING USER-CUSTOMIZABLE OPERABILITY FOR IMAGING OPERATIONS IN IMAGE FORMING DEVICES USING SELECTABLE PLATEN SHEET RULERS, by Paul Roberts Conlon.

U.S. Pub. No. 20130265591 published Oct. 10, 2013, entitled SYSTEMS AND METHODS FOR IMPLEMENTING DYNAMIC USER INTENT-BASED FINISHER OPTIONS IN IMAGE FORMING AND DOCUMENT HANDLING SYSTEMS, by Paul Roberts Conlon.

U.S. Pub. No. 20130301061, published Nov. 14, 2013, entitled SYSTEMS AND METHODS FOR IMPLEMENTING DYNAMIC USER INTENT-BASED IMAGING OPTIONS IN IMAGE FORMING AND DOCUMENT HANDLING SYSTEMS, by Paul Roberts Conlon.

U.S. Pub. No. 20120314229, published Dec. 13, 2012, entitled FRAME-BASED COORDINATE SPACE TRANSFORMATIONS OF GRAPHICAL IMAGE DATA IN AN IMAGE PROCESSING SYSTEM, by Paul Roberts Conlon.

U.S. Pub. No. 20120314230, published Dec. 13, 2012, entitled IMAGE OPERATIONS USING FRAME-BASED COORDINATE SPACE TRANSFORMATIONS OF IMAGE DATA IN A DIGITAL IMAGING SYSTEM, by Paul Roberts Conlon.

U.S. Pub. No. 20140331094, published Nov. 6, 2014, entitled INFORMATION PROCESSING SYSTEM AND INFORMATION PROCESSING METHOD, by Hiroyuki Enomoto, et al.

U.S. Pub. No. 20160350043, published Dec. 1, 2016, entitled IMAGE FORMING APPARATUS, by Ariyoshi Hikosaka.

U.S. Pub. No. 20170024169, published Jan. 26, 2017, entitled PRINTING TO A PAPER-LIKE DEVICE, by David James Snowball.

BRIEF DESCRIPTION

In accordance with one aspect of the exemplary embodiment, a method for assisting a user in selecting a print option for rendering an image includes providing a database of print options for rendering images on different sizes of print media. At least some of the print options include different levels of scaling of the image. Features of an image to be rendered are identified. Based on the identified features, at least one of the following is performed: filtering the print options and sorting the print options in the database, to identify a subset of candidate print options from the database of print options. A graphical user interface is generated for displaying representations of at least some of the candidate print options. The graphical user interface is displayed to a user on a display device, whereby a user is able to select a print option for rendering the image.

One or more of the steps of the method may be performed by a processor.

In accordance with another aspect of the exemplary embodiment, a system for assisting a user in selecting a print option for rendering an image includes a database of print options for rendering images on different sizes of print media, at least some of the print options including different levels of scaling of the image A feature extraction component identifies features of an image to be rendered. A querying component filters and/or ranks the print options in the database, based on at least one of: the identified image features, a printing policy, and current features of an image rendering device, to identify a subset of candidate print options from the database of print options. A graphical user interface generator generates a graphical user interface for displaying representations of at least some of the candidate print options. A display device displays the graphical user interface and enables a user to select a print option for rendering the image on an associated rendering unit.

One or more of the components may be implemented by a processor.

In accordance with another aspect of the exemplary embodiment, a method for assisting a user in selecting a print option for rendering an image includes querying a database of print options for rendering images on different sizes of print media to identify a set of candidate print options. At least some of the print options including different levels of scaling of the image from others of the print options. A graphical user interface is generated for displaying representations of at least some of the candidate print options. Each of the displayed representations of print options including a representation of a sheet of print media with a representation of the image, at the same scale as the representation of the print media sheet, superimposed on the representation of the print media sheet. Provision is made for a user to select one of the displayed representations of the candidate print options. Provision is made for the user to adjust a scale of the representation of the image relative to the representation of a sheet of print media in the selected one of the representations of the candidate print options. Instructions for printing the user-selected print option, with any scale adjustment made by the user, are output.

One or more of the steps of the method may be performed by a processor.

BRIEF DESCRIPTION OF THE DRAWINGS

FIG. 4 is a flow chart illustrating a method for assisting a user in selecting a print option which may be performed with the apparatus of FIGS. 1-3;

FIG. 16 illustrates a database table of available print media; and

DETAILED DESCRIPTION

Aspects of the exemplary embodiment relate to a system and method for integrating Auto Paper Selection (APS) and Auto Reduce/Enlarge (ARE) features in an image rendering system to provide a simplified media selection workflow which provides a user with flexible scaling and print media selection options which are automatically generated and visually represented.

Figure 1:
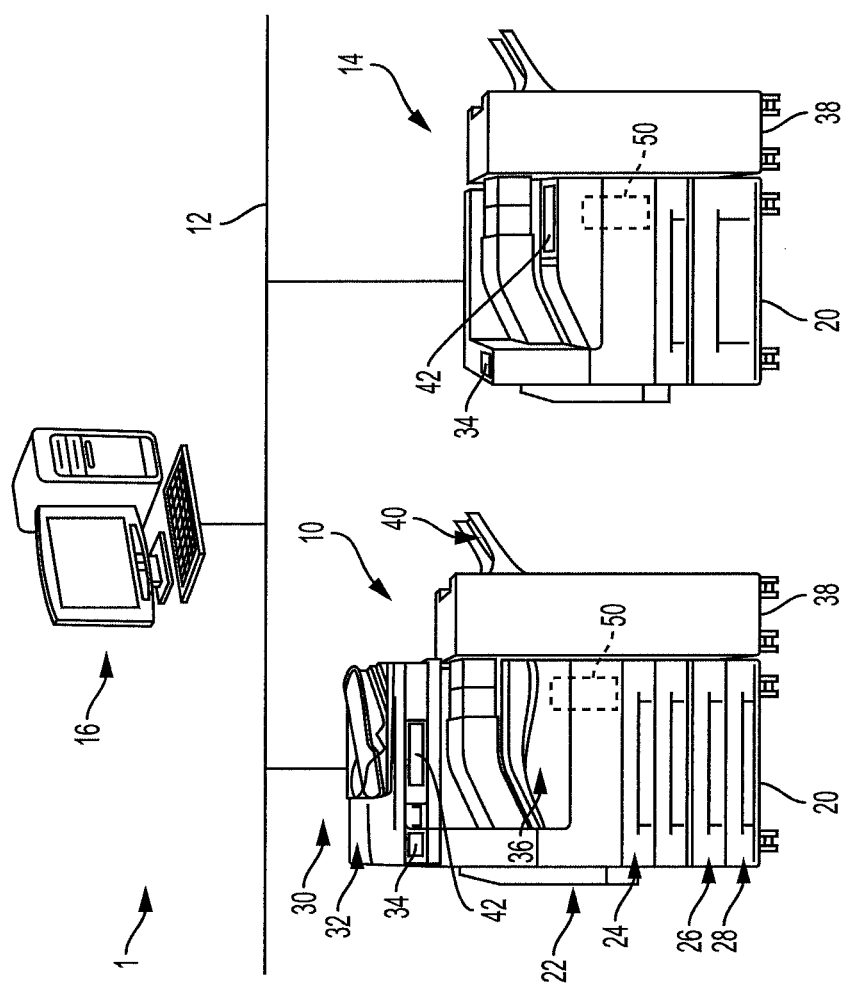
FIG. 1 is a schematic view of a network printing system including an image rendering apparatus.

With reference to FIG. 1, an exemplary printing system 1 includes an image rendering apparatus 10, such as a printer, scanner, fax machine, or multifunction device having two or more of these functionalities. The image rendering apparatus 10 may be connected by a network 12 to other devices 14, 16, such as one or more other printers 14 and one or more computing devices 16. Each image rendering apparatus 10, 14 may be similarly configured, except as noted.

The illustrated image rendering apparatus 10 includes a media supply unit 20, which includes a set of one, two, or more print media sources, such as paper trays 22, 24, 26, 28, which may vary in configuration for accepting different types/sizes of print media, such as paper sheets. An image input unit 30 includes a scanner 32 and/or digital input 34, such as a USB port, for receiving/generating an image of a document to be rendered. A rendering unit 36, such as one or more marking engines, renders the image on print media supplied by the media supply unit 20 using marking media, such as inks or toners. A finishing unit 38 receives the printed media from the rendering unit and optionally provides one or more finishing operations, such as collating, stapling, binding, stacking, or the like. An output unit 40, such as an output tray or trays, outputs the finished, printed media. Units 20, 36, 38, 40 are connected by a paper path (not shown) made up of belts, rollers, or the like, for transporting the print media from the media supply unit 20 to the output unit 40, via the rendering unit 36 and finishing unit 38.

Figure 2:
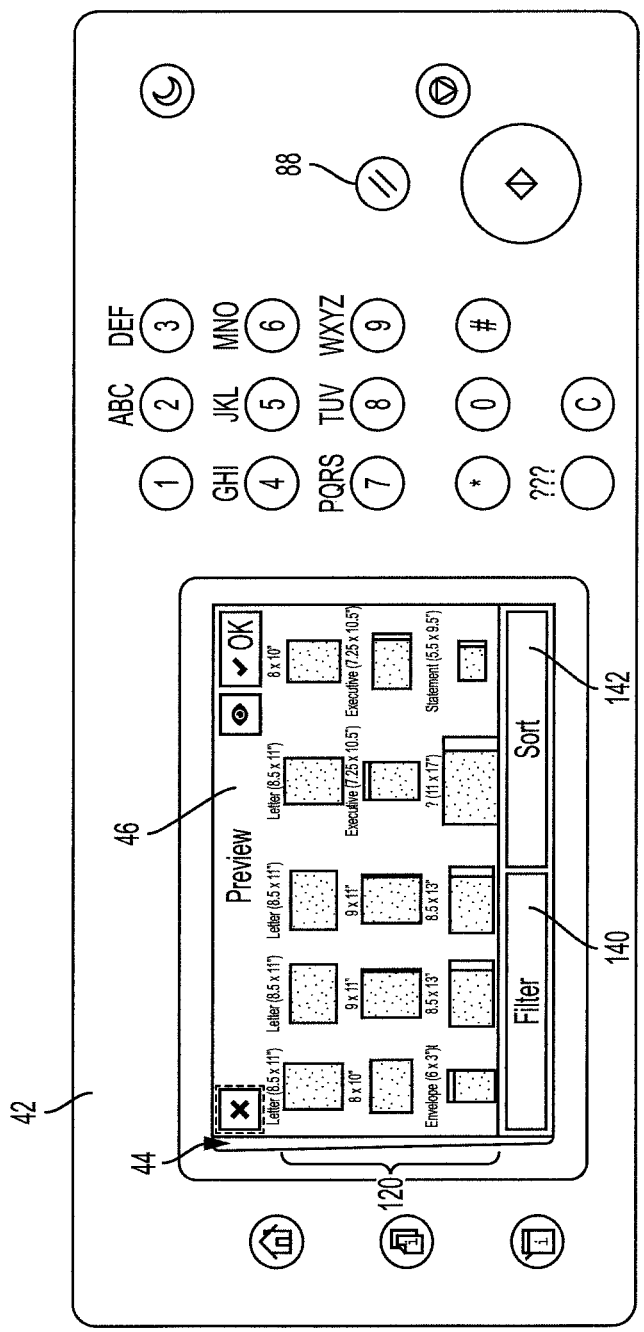
FIG. 2 is a top view of a user interface device displaying a graphical user interface in a gallery display mode.

A user interface device 42 is fixedly or removably mounted to an exterior of the image rendering apparatus 10 and includes a display device 44, such as an LCD screen, as illustrated in FIG. 2. A graphical user interface (GUI) 46 is displayed on the display device 44. The GUI 46 provides a preview of how the scanned or otherwise input image will appear when rendered on different print media. The GUI 46 is generated by a control unit 50, illustrated in FIG. 3, and can be manipulated by a user, e.g., using touch gestures.

The exemplary control unit 50 is communicatively connected with the media supply unit 20, image input unit 30, user interface 42, rendering unit 36 and finishing unit 38 by wired or wireless connections 52. The control unit 50 may be located in the image rendering device or may be wholly or partially located elsewhere in the printing system 1, such as on a network print server (not shown). The illustrated control unit 50 includes memory 54, which stores software instructions 56 for performing the method illustrated in FIG. 4, and a processor 58, in communication with the memory, for executing the instructions. The control unit 50 also includes one or more input/output (I/O) devices 60, 62, for communicating with other components of the image rendering apparatus 10, such as the image input unit 30 and user interface device 42. Hardware components 54, 58, 60, 62 of the control unit 50 may communicate via a data/control bus 64.

The control unit 50 receives image information 70 from the image input unit 30, such as orthogonal dimensions 72 of an image 74 generated by scanning a physical document 76. The control unit 50 receives media information 80 from the media supply unit 20, such as the currently-available types and sizes of print media. The control unit 50 may also store or have access to a print media database 81 which lists a set of print media types that are compatible with the apparatus 10. The list may include print media types not currently present in the media supply unit 20. Media database 81 may be limited to in-house media, i.e., the print media used by a particular print shop.

The control unit 50 outputs GUI information 82 to the user interface device 42 for generating the GUI 46 and receives user input information 84 from the user interface 42 corresponding to user inputs to the user interface. The user may interact with the user interface via a user input device, such as a touch screen 86 of the display device, buttons 88, combination thereof, or the like.

The control unit 50 may also control various processing and operating functions of the apparatus 10, such as copying, printing, paper feeding, finishing, and the like.

The control unit 50 may include one or more computing devices, such as a central processing unit, microprocessor, or other computing device capable of executing instructions for performing the exemplary method. The memory 54 may represent any type of non-transitory computer readable medium such as random access memory (RAM), read only memory (ROM), magnetic disk or tape, optical disk, flash memory, or holographic memory. In one embodiment, the memory 54 comprises a combination of random access memory and read only memory. In some embodiments, the processor 58 and memory 54 may be combined in a single chip. Memory 54 stores instructions for performing the exemplary method as well as the processed data. The digital processor device 58 can be variously embodied, such as by a single-core processor, a dual-core processor (or more generally by a multiple-core processor), a digital processor and cooperating math coprocessor, a digital controller, or the like. The I/O interfaces 60, 62 may comprise a modulator/demodulator (MODEM) a router, a cable, and/or Ethernet port.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 5A:
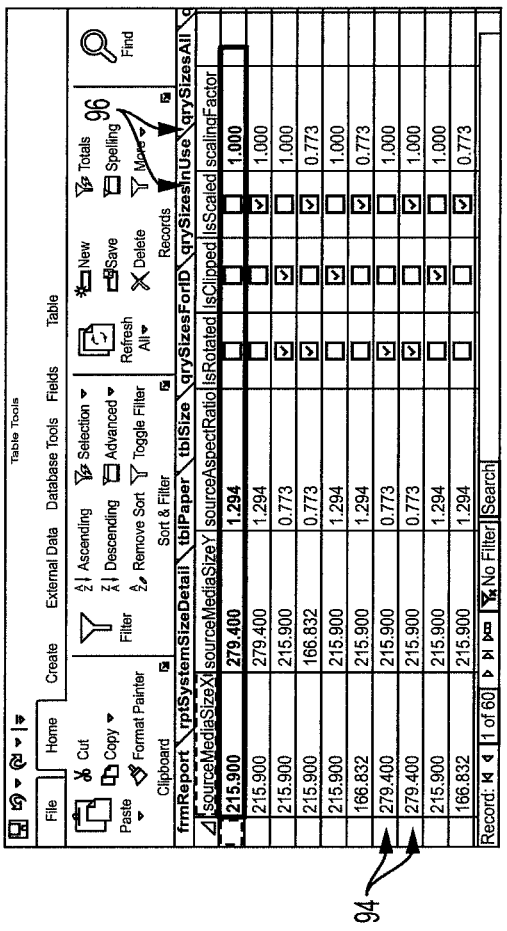
FIG. 5, which is split into FIGS. 5A and 5B for ease of illustration, illustrates a master database table, for use in the apparatus of FIG. 3.
Figure 5B:
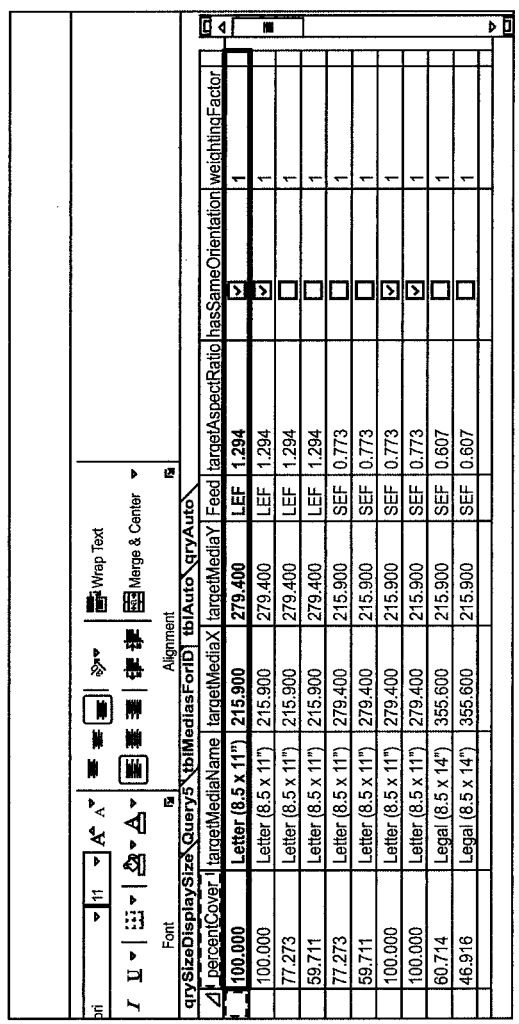

The control unit 50 has access to a master database 90 comprising one or more database tables, and a set of one or more policies 92. The database 90 and policies 92 may be stored in memory 54 and/or accessed from a remote memory. An example master database table 90 is illustrated graphically in FIG. 5, which is split, for readability, into FIGS. 5A and 5B. The master database 90 stores a collection of print options 94 for rendering images on different sizes of print media, each print option being a combination of features. Some of the features relate to the selectable types of print media, such as paper size (e.g., letter size, A3, A4, envelope size, etc.), paper type (plain, heavyweight, etc.), paper color (white, blue, etc.). Other features relate to adjustments to the image, such as scaling (reduce/enlarge), rotation, etc. Thus, different print options can include different combinations of print media size and levels of scaling of the image. In general, there may be at least four, or at least five, or at least six different print option features, each feature being associated with a set of at least two possible values or a range of possible values.

The illustrated features, illustrated by the columns of the database, include the source media (image) size, in horizontal (X) and vertical dimensions (Y), in mm, the source media (image) aspect ratio (Y/X) (when the sheet is rotated 90°, this equates to X/Y), whether the image is rotated, clipped, and/or scaled relative to its original size and/or orientation, the scaling factor for the image (1.00 indicates no scaling), the percentage of the target media (print media) covered by the image, the target media name (letter, legal, etc.), the target media horizontal and vertical dimensions (X,Y), in mm, the feed direction (long edge first (LEF), short edge first (SEF)), the target media aspect ratio, whether the image has the same orientation as when scanned, and optionally a weighting factor. Each row of the database represents a respective print option 94, which is a combination of the features which the image rendering apparatus 10 can provide, e.g., based on the constraints of the image rendering apparatus, such as that the envelope feed tray can only feed envelopes in one orientation, that the print media supply unit can only supply media of certain types and/or sizes, etc. As will be appreciated the master database 90 may include a large number of possible options and may be generated from the print media database 81, as well as information on typical sizes of images that are scanned by calculating data for the database 90 (such as scaling, clipping, orientation, etc.). Some of the print options provide a combination of paper size selection and image scaling. The database 90 can be sorted and/or filtered using different queries to generate different temporary database tables 95 (FIG. 3), which are accessed by tabs 96 in the embodiment shown in FIG. 5.

The policies 92 may be specified by a user or an administrator, or preinstalled. Each policy 92 defines criteria for ranking at least some of the print options 94, given an input image 74. The criteria for a given policy may include constraint criteria whereby certain features are set, such as whether the image can be rotated, cropped, scaled, rotated, etc., whether the print media options are to be limited to those currently available on the apparatus 10, or whether other print media types can be considered, and if so, which. The criteria for a given policy may also include ranking criteria, whereby certain features are given higher priority in the ranking of options than others, such as a percent coverage priority, or a function which weights two or more features. Given the constraint features, the options can be ranked based on the ranking criteria. The policies 92 may be set for each image rendering apparatus 10, 14 individually, or replicated to other devices, e.g., on a fleet basis. In one embodiment, the policies 92 may be set through a graphical user interface, e.g., generated on the client device 16, and uploaded to the control unit 50. This may be used to modify existing policies or generate new ones.

Figure 3:
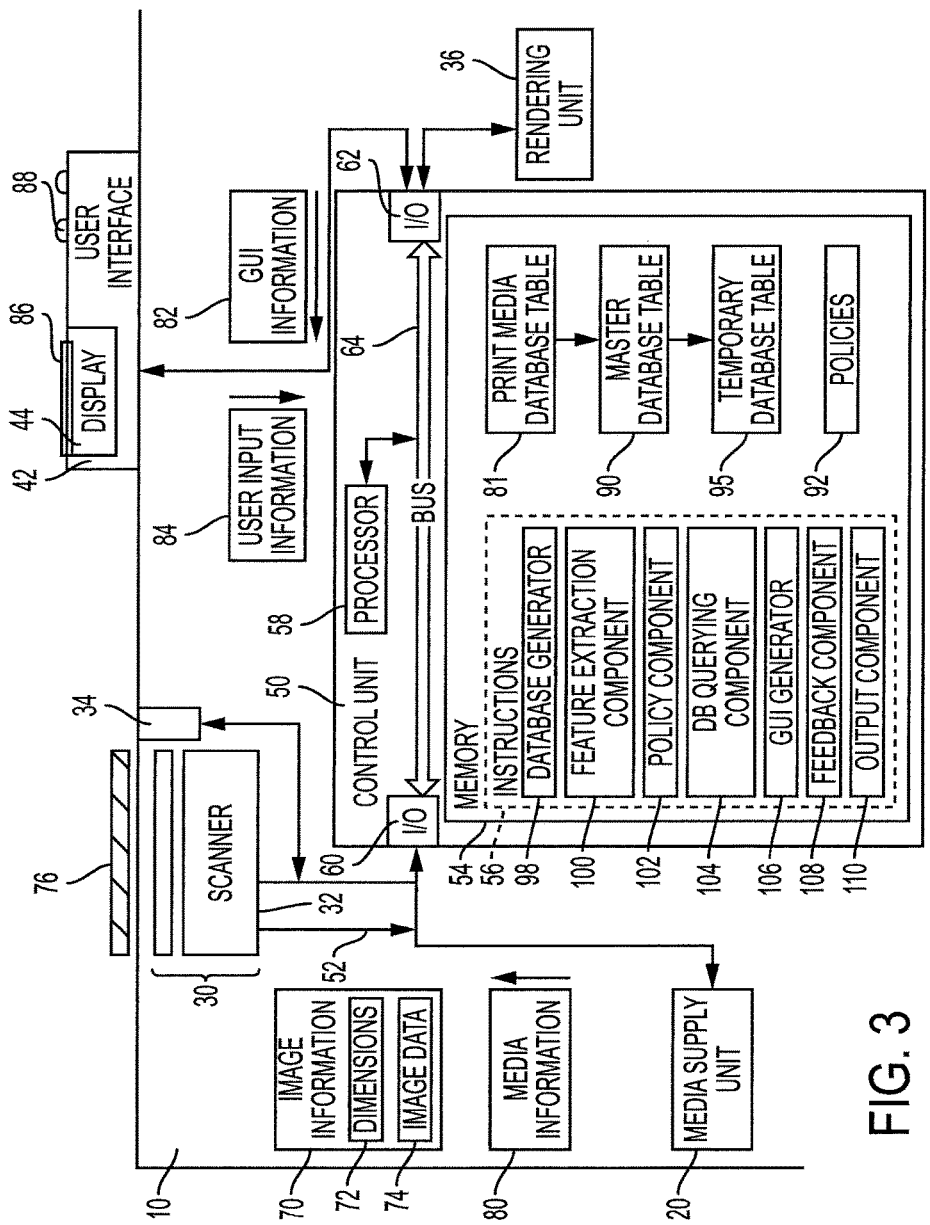
FIG. 3 is a functional block diagram of the image rendering apparatus of FIG. 1.

As illustrated in FIG. 3, the instructions 56 for implementing the GUI include a database generator 98, a feature extraction component 100, a policy component 102, a database querying component 104, a GUI generator 106, a user feedback component 108, and an output component 110.

Briefly, the database generator 98 generates a master database table 92 based on the print media table 81. This can be performed offline, on a separate computing device. The feature extraction component 100 identifies features of the source (e.g., scanned) image 74, such as the X,Y dimensions 72 and its orientation. The feature extraction component 100 may also identify current features of the imaging apparatus 10, such as the print media currently available in the media supply unit trays. The policy component 102 identifies a policy 92 to be applied for a print job including the image to be rendered. The database querying component 104 queries the database 90 with the identified image features, e.g., in the form of SQL queries, to identify print options for rendering the image on print media, as constrained by the identified policy 92. The identified subset of print options may be temporarily stored in a temporary database 95, which may be in the form of a new table in the database 90, and may be sorted based on the policy 92 and/or based on user criteria received from the user interface device by the user feedback component 108. The new table 95 can be manipulated with queries, such as SQL queries (to filter, sort, range limit, etc.), based on user inputs. The print options may be ranked based on criteria set by the policy or selected by the user.

The GUI generator 106 generates a graphical representation 120 of a set of candidate print options drawn from table 95, which includes some or all of the set of ranked options (e.g., ordered based on the ranking) and outputs the representation to the user interface device 42. In other embodiments, the candidate print options and the GUI generator 106 may simply output a candidate set of print options, e.g., ordered by size, scaling, and/or other feature, or randomly. In this way, the user is not shown only the "best" option (according to a given selection and/or ranking criteria), but is able to be shown graphical representations of a plurality of different print options which use different sizes of print media, different image scaling factors, images with and without image rotation, and/or other variable features, and combinations thereof, that the user can view and decide what is best for their application.

The user feedback component 108 receives feedback from the user interface 42 corresponding to recognized touch gestures and communicates information to the GUI generator 106 for modifying the GUI 46, based on the recognized touch gestures. The output component 110 outputs a user-selected print option (optionally modified via the GUI) to the rendering unit 36, or to one or more other processing components (not shown), which process the image 74 for rendering on the rendering unit. In the absence of a user-selected print option, a default print option is output, which may be the most highly ranked one of the candidate print options.

With reference to FIG. 3, a method for selecting a print option for a print job is illustrated. The method begins at S100.

At S102 a master database 90 and a set of policies 92 are provided in memory.

At S104, features of an image 74 to be printed are identified, e.g., extracted by the feature extraction component 100.

At S106, current features of an image rendering device to be used in rendering the image 74 may be identified (e.g., currently available print media), e.g., extracted by the feature extraction component 100.

At S108, where more than one policy is available, one of the policies 92, to be used in printing the image, is identified, e.g., by the policy component 102.

At S110, the master database 90 is queried with the features obtained at S104 and S106, and constraints of the identified policy, to identify an optionally-ranked subset of print options 94, from the master database table, which may be stored in a temporary database table 95, by the database querying component 104

At S112, a graphical user interface 46 is generated by the GUI generator 106, which includes a representation of each of at least some of the print options in the ranked subset. The GUI is displayed to the user on the user interface 42. The user may scroll through the print options, sort and/or filter them, and/or modify a print option, e.g., by resizing the image.

At S114, in response to user manipulations of the user interface, instructions are received, by the user feedback component 108, for selecting and optionally modifying one of the print options. The GUI 46 is modified in response to the user's selection(s) and modification(s). This step may be iterated one or more times as the user reviews different print options/modifications.

At S116, instructions for rendering the image 76, according to the user-selected (and optionally modified) print option are output to the rendering unit 36, by output component 110.

The method ends at S118.

The method illustrated in FIG. 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the control unit 50, (for example, an internal hard drive of RAM), or may be separate (for example, an external hard drive operatively connected with image rendering device 10 and/or the system 1), or may be separate and accessed via a digital data network such as a local area network (LAN) or the Internet (for example, as a redundant array of inexpensive or independent disks (RAID) or other network server storage that is indirectly accessed by the control unit 50, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIG. 4, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details of the system and method will now be described.

Figure 6:
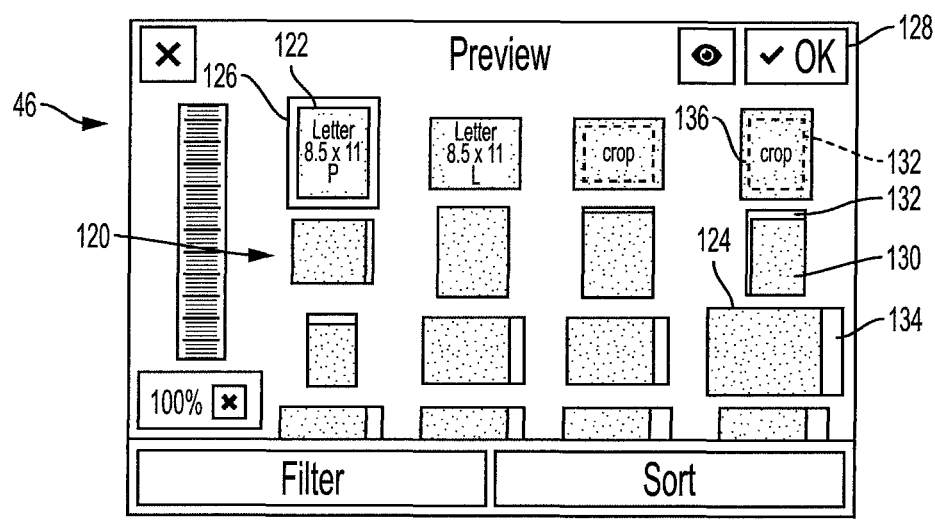
FIG. 6 illustrates a graphical user interface in a gallery view mode.

As illustrated in FIG. 6, in a gallery view mode, the GUI 46 displays a gallery 120 of print option representations 122, 124, etc. each representing a respective one of the print options. While a two-dimensional array of print option representations 122, 124 is illustrated, the option representations may be arranged in a one-dimensional array. The option representations may be ordered in the array based, at least in part, on their rankings. For example, the representation 122 of the highest-ranked print option (e.g., best fit, based on the policy) is represented at the top left of the gallery, with lower-ranked options 124 displayed below, and/or to the right of the highest-ranked option. Depending on the policy or user selections, the exact/best fit print option may be auto-selected and/or the user may be prompted to select one of the print option representations. For example, the highest ranked option may be highlighted, e.g., with a border 126. This print option is automatically selected for printing if the user clicks on a select key 128. The gallery 120 provides a visualization of relatively-scaled media, giving the user a better understanding of how different print options in the set will look when printed.

In other embodiments, the control unit may not rank the candidate print options and the GUI generator 106 may simply generate the gallery 120 from a candidate set of print options, e.g., ordered by size, scaling, and/or other feature, or randomly.

Each print option representation 122, 124, includes a representation 130 of the image 74, superimposed on a print media representation 132. Each representation 122, 124 is shown to scale, based on the size of the print media and the area which would be occupied by the printed image. Thus, for example, the letter size print media representations 132 are smaller than the A4, and so forth. Unless constrained by a user or by a policy, the GUI may show representations of two, three or more different sizes of print media and two different orientations of the image (i.e., same as original and rotated 90° relative to the original).

The print media representation 132 may be illustrated as a rectangle or other-shaped bounding box. A color or pattern fill may be used to represent different print media colors and/or different print media types. The scaled media sizes are derived from actual media sizes in the media database, and are relative to each other. The representations of some of the candidate print options include a region 134 representing white space on the print media, where the image does not fill the print media sheet, as illustrated, for example on representation 124. Region 134 may be a different color and/or patterned differently from the image representation 130, for visual differentiation. The image representations 130 may be in the form of tiles, icons, mimics or raster/bitmap scaled down actual images (image thumbnails). The gallery may show associated data for each print option representation, such as the scaling factor, percentage coverage, etc. Cropped images 136 may be visualized, e.g., showing the print media representation 132 as a dashed rectangle.

In the exemplary embodiment, scaling (ARE) and Auto Paper Selection (APS) are both considered in the generation of the gallery 120, such that the gallery displays different combinations of print media selection and scaling factors, etc., unless constrained by a particular policy 92 or user selection. As can be seen in FIG. 6, for example, representation 124 on A3 size paper, shows the image representation scaled to fit the paper size, and thus the image appears larger than on letter-size representation 122. As will be appreciated, the print options are not limited to ARE/APS variations, but can include other print media attributes, such as paper color, watermarks, etc., which may be illustrated graphically in the gallery. The gallery 120 may be constrained to the print media currently loaded in the trays, or show representations of print options that would require the user to load a different print medium into the media supply unit 20. This enables the gallery to factor in many attributes, such as color, type, etc. In an exemplary embodiment, all selection possibilities stored in the database 95 are generated, allowing them to be graphically available for user selection, even if not initially included in the gallery 120.

Figure 7:
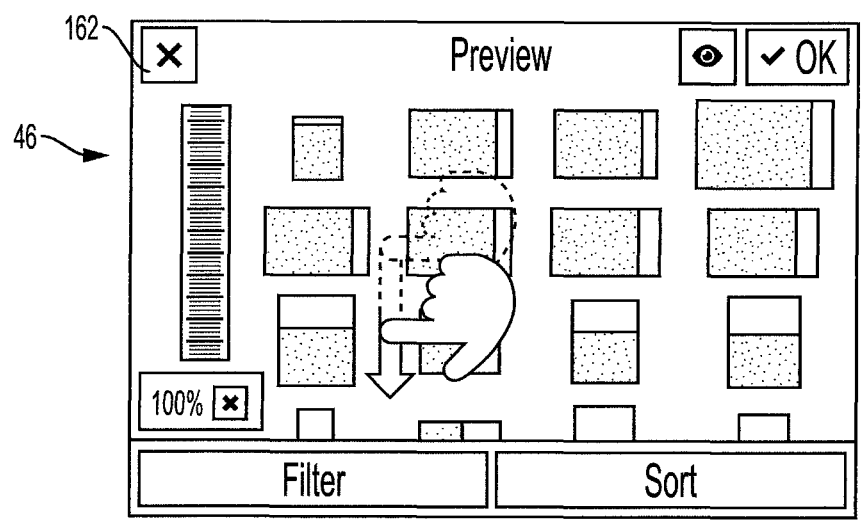
FIG. 7 illustrates the graphical user interface of FIG. 6 being manipulated by a user to scroll through the displayed gallery.

In one embodiment, the GUI 46 serves as a viewport, showing only a subset of the generated option representations 122, 124, at one time. The user can navigate the gallery 120 with predefined touch gestures. As illustrated in FIG. 7, for example, the user can swipe (e.g., up or down, right or left) to see other available print option representations.

Figure 8:
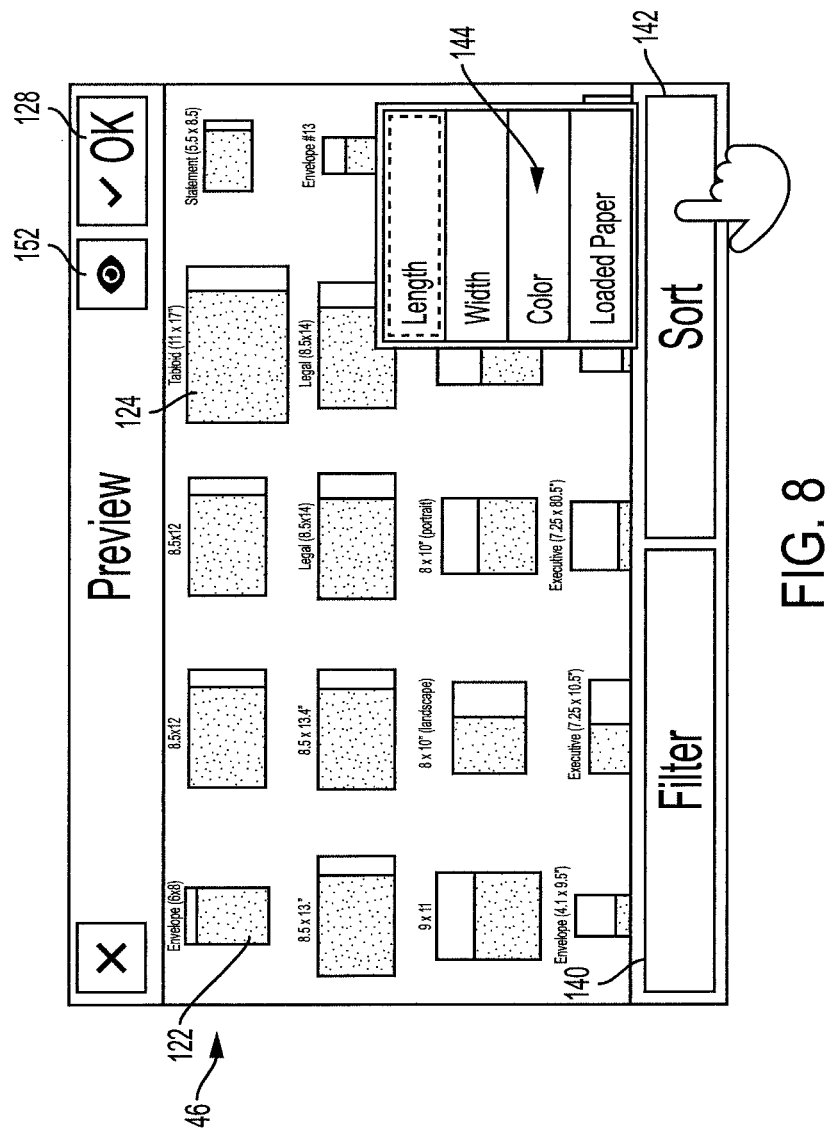
FIG. 8 illustrates the graphical user interface of FIG. 6 being manipulated by a user to sort the gallery.

As illustrated in FIG. 8, the user can filter and/or sort the option representations 122, 124, based on user-selectable criteria, using respective soft keys 140, 142. In FIG. 8, the user has selected the sort key 142, which brings up a pop-up menu 144. The menu allows the user to select from a set of two or more sorting options, e.g., print media length, print media width, print media color, or loaded paper (print media currently loaded on the printer 10 will appear in the more highly ranked positions). The user's selection may be highlighted on the pop-up menu. The filter key 140 allows the user to select from a set of filtering options, which excludes some of the print options from the gallery and/or adds additional ones. For example, the filtering options may allow the user to override a current policy requiring that the orientation must remain the same. Or, a filtering option may allow the user to select a subset of the features, such as "no envelope," "only letter size options," "only at least 50% coverage options," or the like. In a basic mode, the display may represent only those options related to media currently configured in machine but can be extended, e.g., through the soft keys, to include all standard media sizes.

Figure 9:
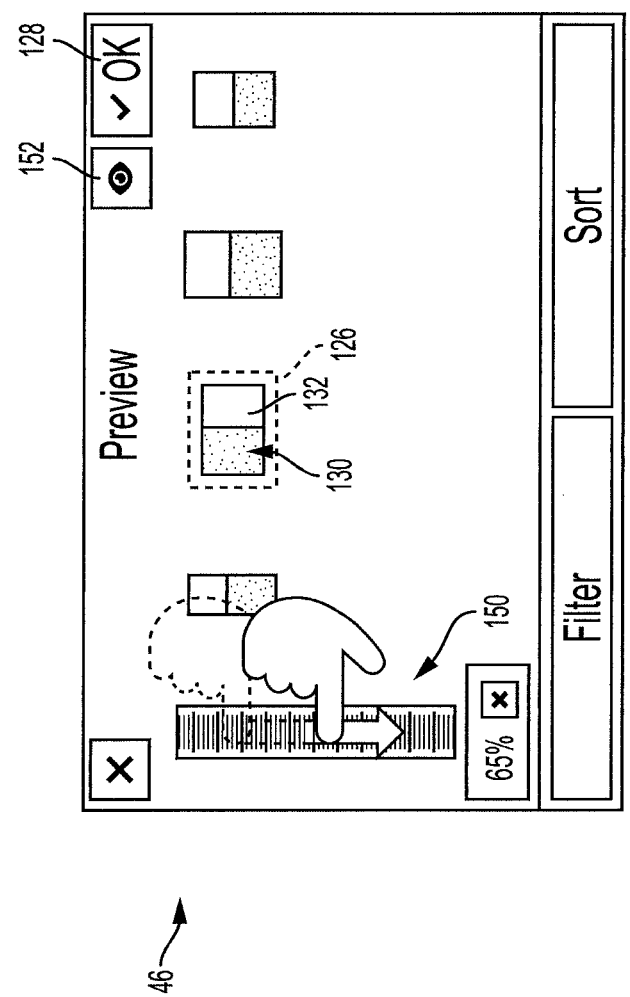
FIG. 9 illustrates the graphical user interface being manipulated by a user to rescale an image representation.
Figure 10:
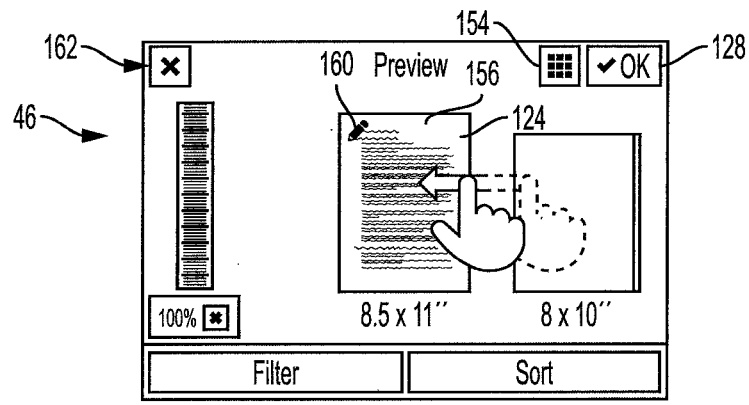
FIG. 10 illustrates a graphical user interface in a list view mode being manipulated by a user to scroll through a sequence of print options.
Figure 11:
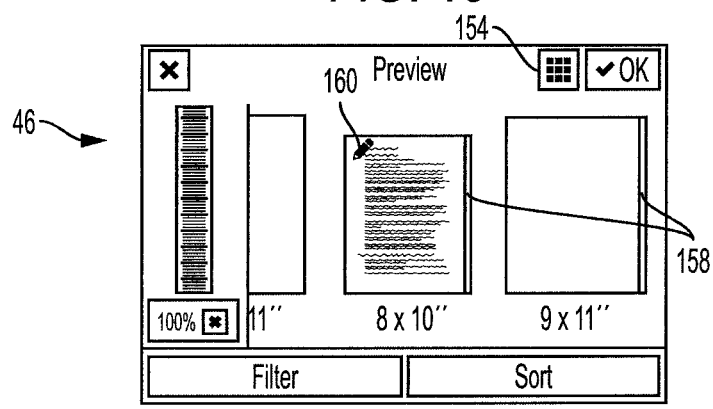
FIG. 11 illustrates the graphical user interface of FIG. 10 illustrating coverage of the target media by an image.
Figure 12:
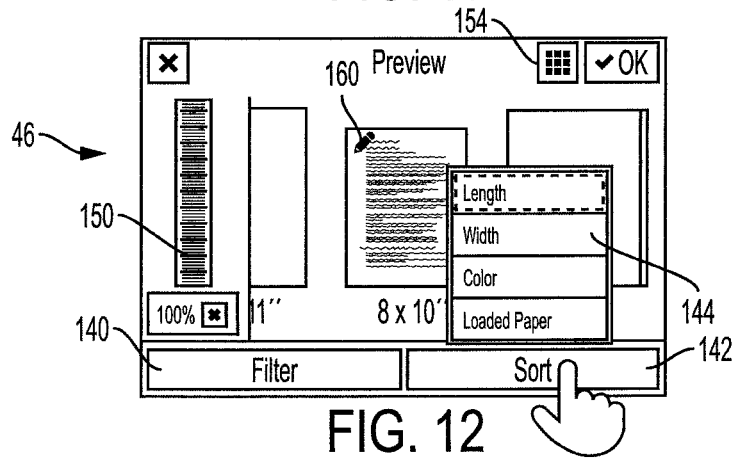
FIG. 12 illustrates the graphical user interface of FIG. 10 being manipulated by a user to sort the list view.

In some embodiments, the gallery 120 can be blended with manual reduction/enlargement of the image. As illustrated in FIG. 9, for example, additional filtering and fitting can be performed by the user using a scaling mechanism 150, such as a slider, which scales the image representation 130 relative to the print media representation 132 in response to a user input, such as a touch gesture. In FIG. 9, for example, the user has selected to reduce the image to 65% of its original size by dragging the finger down the slider. This feature allows fine-grained scaling, rotation etc. to be performed on a selected option. For example, the user may choose to crop the image slightly, center it on the print media, or shift it relative to the print media. This feature can be merged with a more detailed print preview feature in which the user can see a more realistic representation of how the image will appear on the print media when printed, as illustrated in FIGS. 10-12.

The database 90, 95 may be configured for SQL querying, allowing a range of policies, user selections, and the like to be implemented on the database through the queries. The database 90 can be readily extended by adding new media which can then be used for generating the gallery. The database 90 may be manipulated by advanced algorithms (optimization, mathematical, etc.), such as Mathematica (https://www.wolfram.com/mathematica/) or C++/Java math libraries. Such a modeling library can be used for calculations of optimal scaling to fit given print media sizes, ranking the options based on multiple criteria, etc. Advanced sorting techniques, using multiple nested sorts, can be employed, which is a benefit of being database-enabled. Various criteria, e.g., weighting, can influence the sorted order in the gallery or subsetting/filtering. For efficient querying, the database 90, 95 may be converted to or stored as a relational database, such as PostgreSQL, enabling SQL queries to be used for implementing the policies, user filtering/sorting options, and so forth.

The present system and method facilitate implementation of workflows that visualize APS and Reduce/Enlarge (RE). Visualizing this process helps to remove trial and error, waste, and dissatisfaction of the current workflow. The workflows can be extended to incorporate a number of other features, such as "Print hold in queue," "Just Print It" feature, "Print from USB," etc., with or without scaling.

While in the illustrated embodiment, the user is presented with a gallery through the user interface, in other embodiments, the control system may select the optimal print option, given the policy and/or user constraints, without presenting other candidate print options to the user via a GUI. In this embodiment, the selection algorithm can function without a user interface (feeding APS/ARE may be selectable through the Copy function, or alternative media selection through the Print function).

Example Workflows

Example workflows that illustrate some of the benefits of visualizing APS and R/E to the user are now described.

In these workflows, an initial best fit is indicated, based on a dynamic list of possibilities generated once the image has been scanned. Icons/mimics/images of media are scaled according to actual size and other media attributes derived from the media database values. The optimizations can be leveraged through the Print function. Unless the user chooses to display the gallery, the initial best fit is automatically printed.

1: Select by Gallery

A gallery view is generated, as illustrated in FIGS. 6-9, which the user can sort, filter and adjust "on the fly." Objects within the view are displayed in relative size making it easier to comprehend. View criteria can be changed. If so, the view will dynamically be updated and a new "best fit" is automatically identified.

A user can quickly navigate through the view using gestures. In addition, user capabilities, such as scaling, can be incorporated. A user can reduce/enlarge an image which would cause the view to dynamically update and the next best fit automatically selected. Additional view information may be displayed on the object such as percent coverage or scaling, which could improve comprehension.

2: Select by List

A carousel view is generated, as illustrated in FIGS. 10-12. This view may be selected through an icon 152 on the screen (FIG. 9) or a recognizable touch gesture. Another icon 154 (FIG. 10) is selected to return to the gallery view. In the carousel view, the user can sort, filter and adjust "on the fly." View criteria can be changed. If so, the view will dynamically be updated and a new "best fit" automatically chosen. In this view, policy settings, such as auto-scaling, may determine the initial display of the image on each of the available paper types as a continuous sequence of print option representations that may be larger in size than in the gallery view. For example, the carousel view may show no more than three or four print option representations at one time, such as a currently considered print option representation and the immediately preceding and following print option representations in the sequence (or portions thereof). In contrast, the gallery view may show at least twice the number of print option representations, such as at least six, or at least eight, or at least ten print option representations (or portions thereof).

This workflow shows the scanned image as a preview in relative size to other view options. A user can swipe left/right to switch from the current target sheet. The user can also scale up and down, filter, and sort, which dynamically adjusts the view.

As the user flips from one print option representation 122 to another with a gesture recognized by the user interface, such as a swipe from one representation to another, a preview image 156 may be displayed as the print option representation 124, which provides a more realistic view of how the image 74 will appear when rendered. Areas of the print media that do not fit the scanned image may be graphically indicated, as shown at 158 (FIG. 11). Filter and sort options and user scaling may be provided in the carousel view (FIG. 12), as described above for the gallery view.

3: Select by Image

Figure 13:
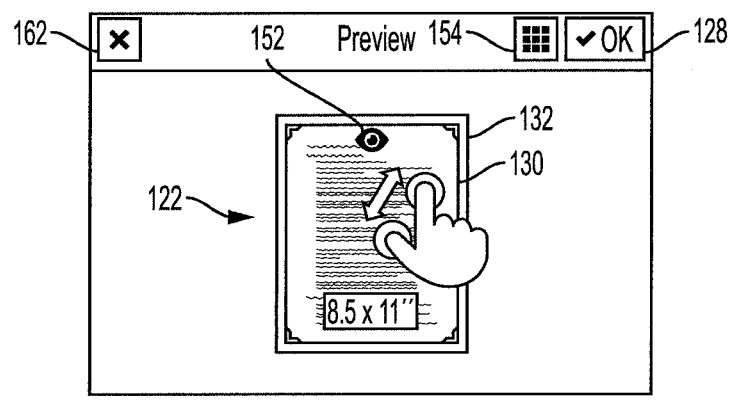
FIG. 13 illustrates a graphical user interface in a stacked view mode being manipulated by a user to rescale an image representation.
Figure 14:
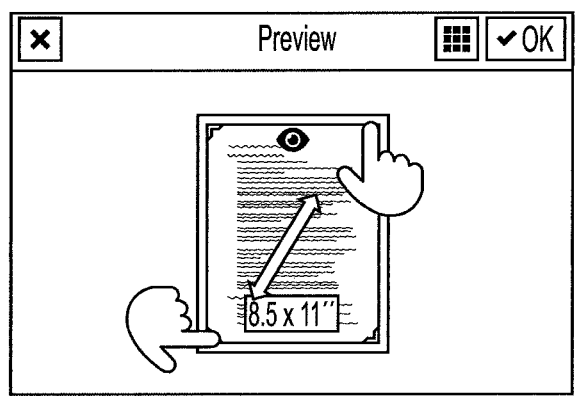
FIG. 14 illustrates the graphical user interface of FIG. 13 being manipulated by a user to rescale an image representation.
Figure 15:
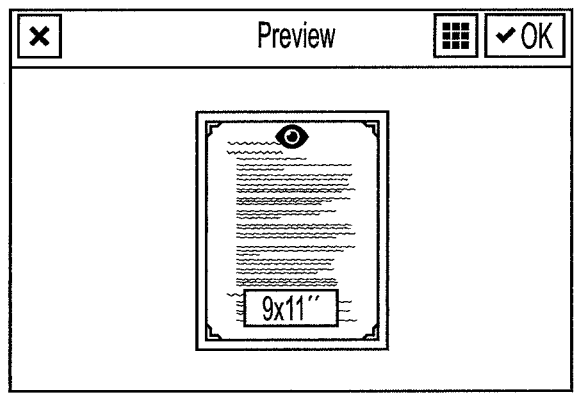
FIG. 15 illustrates the graphical user interface of FIG. 13 showing an image representation rescaled to a size larger than the target media.

A stacked view is generated, as illustrated in FIGS. 13-15. The stacked view may be entered by clicking an icon 160 on a preview image 156 (FIG. 10). To return to the list view or gallery view, respective icons 152, 154 can be actuated. In the stacked view, a single print option representation 122 is displayed. View criteria (not shown) may be included and be allowed to change.

This workflow combines APS, R/E, preview, and predefined multi-touch gestures for scaling/positioning the image representation 130 with respect to the print media representation 132. This workflow allows a user to do resizing including scale-to-crop (beyond the current target sheet 132). Also, a user can scale to the next best target sheet. This allows a user to jump to the next larger best fit size or slightly adjust the scanned image before printing, eliminating undesirable outcomes from the current implicit rules. In some embodiments, the system may automatically move to the next larger/smaller print media size when the user scales the image larger/smaller than a threshold amount relative to the size of the print media.

As shown in FIG. 13, a user places two fingers (or other physical objects) on top of the displayed image representation 130 and moves them apart to increase the size of the image relative to the sheet. This multi-touch gesture serves as an enlarging scaling mechanism. The image increases in size (but may retain the same aspect ratio) as the fingers move apart (or decreases, as they move together). A two-fingered gesture on the corners of the image representation 130 may alternatively be used to reduce/enlarge the image representation 130 in size, with respect to the print media representation 132, as shown in FIG. 14.

While the three workflows are shown separately, they may be combined into one, allowing the user to switch between views based on their preferences.

Additionally, all of these workflows could be combined with other customization options, such as defaults, presets, and 1-touches. At any time, the user can select to print the selected print option representation 122, as optionally modified by the user. To exit from any of the views, the user may select an exit icon 162, which brings the user back to a main Print screen.

The exemplary system and method have advantages over existing techniques. For example, when a conventional APS system does not have an exact match (e.g., the paper is not loaded, or due to a non-standard size) it searches larger sizes until a non-clipped, non-scaled image can be placed. In contrast, the present system can also search media that is close in size (smaller or larger), with slight scaling to give the closest selection to the original. This opens up many additional choices for the user.

Prototype Example

A media database table 81 (FIG. 16) to test with database queries was created using a "make table" query in Microsoft Access™. The media database 81 was configured with the selectable products and trays constrained to refer to media in inches vs. metric. The columns were constrained via an SQL query. In this example, all the print media sizes are shown for the same tray (Tray 1), although it is to be appreciated that different print media may be associated with respective designated trays. Each row of the table 81 shows a different combination of tray name, size name, feed direction, and short edge and long edge dimensions (in mm).

This information can be imported into the master database table 90 using PostgreSQL and the Microsoft SQL server. Any number of views of the data can be created, either predefined by the manufacturer of the apparatus 10, or by a user at the apparatus location, e.g., through an interface on the client device 16 or the user interface device 42. All combinations of scaling, fit, clipping, orientation tests, etc. can be captured in the derived master database table 90.

For prototype purposes, the data is first pulled into Mathematica, via Open Database Connectivity (ODBC), for performing the calculations, such as scaling factor and % coverage. For this example, data is pulled simply based on columns. However, a full SQL interface may be used (e.g., SELECT DISTINCT from table WHERE criteria ORDER BY . . . ). Using an underlying database allows for the generation of many kinds of galleries/orderings/displays, as well as providing easier access to analyze the data. This is useful not only for data management, but also the integration with computational libraries. To create the data structures and integrate with advanced libraries would be more difficult and fixed. This architecture is much more extensible, flexible, and accessible.

Routines were written to generate the database in Mathematica from the input 81, and then write the data back out to a new database table 90. In the example, the source media (e.g., 8.5×11) was compared against the set of target media (in database table 81). Original and rotated input were checked, clipping was tested, and also scale to fit. If one or both edges match, then the scaling (isomorphic) is 100% (assuming it is not clipped). This meant there were some redundancies in the gallery 120. These redundancies could be filtered out with an SQL DISTINCT clause. Percent coverage/overlap was computed (i.e., by how much the un/clipped, un/scaled source media fill up/overlap the target medias). Input/source and output/target media orientations are compared. This allows a user to express, for example, a preference via the sort key for the input orientation to align with the target orientation, if possible. This could also be implemented with a weighting in the database. Since alignment with extreme scaling is not typically desirable (for example, rotating and placing a highly-scaled text page onto Tabloid size paper) this may be weighted less than a candidate print option with less extreme scaling. The database format allows a variety of computation operations, such as sorting, filtering, constraining (e.g., limits on scaling, after sorting) to be used independently or combined in an open, extensible manner.

Figure 17:
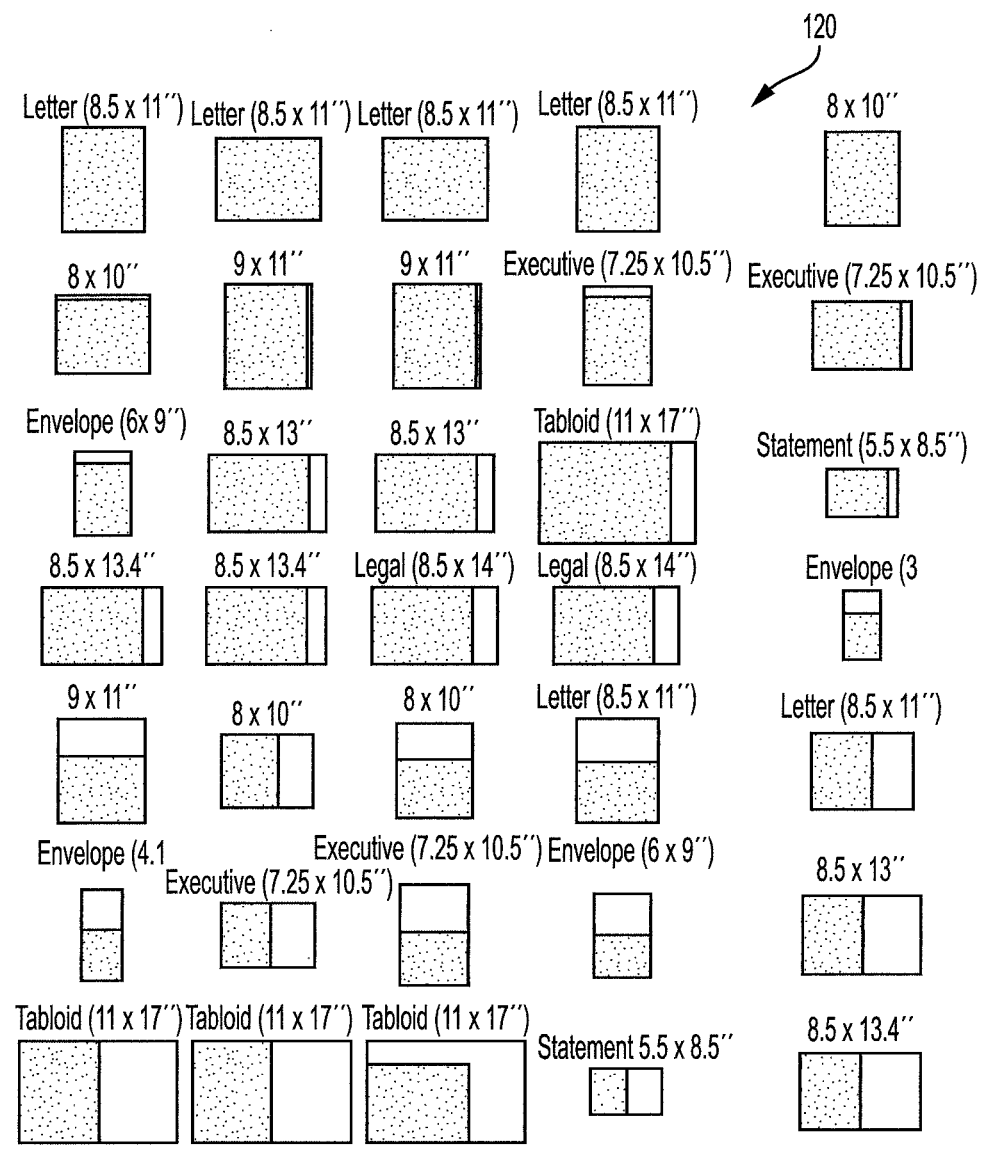
FIG. 17 illustrates an example gallery.

One generated gallery, shown in FIG. 17, used a query sort based on coverage (See FIG. 5). This type of gallery is useful for photographs, where the aim is to fill the sheet as much as possible. Print options involving clipping were filtered out via a SQL query. The gallery is also sorted by preference that the source orientation matches the target orientation (to avoid scaling problems resulting in one axis of the image being compressed). In another gallery, the key sort field was the scaling factor, resulting in quite a different view (not shown). Some of the print option representations are duplicates. This redundancy can be removed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for assisting a user in selecting a print option for rendering an image, comprising:

providing a database of print options for rendering images on different sizes of print media, at least some of the print options including different levels of scaling of an image to be rendered in combination with rotation of the image, and at least some of the print options including different levels of scaling of the image without rotation of the image;

automatically identifying features of an image to be rendered, the identified features of the image including dimensions and an orientation of the image;

based on the identified features, performing at least one of: filtering the print options and sorting the print options in the database, to identify a subset of candidate print options from the database of print options;

generating a graphical user interface for displaying representations of at least some of the candidate print options; and displaying the graphical user interface to a user on a display device, whereby a user is able to select a print option for rendering the image.

2. The method of claim 1, wherein at least one of the identifying features of the image, filtering the printing options, sorting the printing options, generating the graphical user interface, and displaying the graphical user interface is performed with a processor.

3. A system for assisting a user in selecting a print option for rendering an image, comprising:

a database of print options for rendering images on different sizes of print media, at least some of the print options including different levels of scaling of the image;

memory which stores a printing policy which defines criteria for filtering and/or ranking at least some of the print options, given an input image, the criteria identifying whether the input image can be rotated, cropped, and scaled;

a feature extraction component for identifying features of an image to be rendered;

a querying component which filters and/or ranks the print options in the database, based on the identified image features and the printing policy, to identify a subset of candidate print options from the database of print options;

a graphical user interface generator which generates a graphical user interface for displaying representations of at least some of the candidate print options; and a display device which displays the graphical user interface and enables a user to select a print option for rendering the image on an associated rendering unit.

4. The method of claim 1, further comprising at least one of:

identifying current features of an image rendering device and wherein the filtering of the printing options is also based on the current features; and identifying a policy to be used in rendering the image and wherein the filtering of the printing options is also based on the identified policy.

5. The method of claim 1, wherein the representations of the at least some of the candidate print options each comprise a representation of a sheet of print media with a representation of the image, at the same scale as the print media sheet, superimposed on the print media sheet.

6. The method of claim 5, wherein the representation of at least one of the candidate print options includes a region representing white space on the print media.

7. The method of claim 1, wherein the print options in the database are each associated with a plurality of features.

8. The method of claim 7, wherein the print option features include features of selectable types of print media, image related features, and combinations thereof.

9. The method of claim 7, wherein the features of selectable types of print media are selected from the group consisting of: print media size, print media type, print media color, and combinations thereof.

10. The method of claim 7, wherein the image related features are selected from the group consisting of: scaling of the image relative to its original size, rotation of the image relative to its original orientation, and combinations thereof.

11. The method of claim 7, wherein the print option features are selected from the group consisting of image size, in horizontal and vertical dimensions, an aspect ratio of the image, whether the image is rotated relative to its original orientation, whether the image is clipped relative to its original size, whether the image is scaled relative to its original size, a scaling factor for the image, a percentage of the print media covered by the image, a print media name, horizontal and vertical dimensions of the print media, a feed direction an aspect ratio of the print media, a weighting factor for the print option, and combinations thereof.

12. The method of claim 7, wherein the print option features include at least five features.

13. The method of claim 1, wherein the graphical user interface includes at least one of:

a gallery view in which the graphical user interface displays an array of at least six print option representations; and a list view in which the graphical user interface displays a scrollable arrangement of the print option representations.

14. The method of claim 1, wherein the graphical user interface displays at least one of a sort key and a filter key, the sort key allowing the user to select from a set of two or more sorting options for sorting the candidate print options to order the displayed print option representations on the graphical user interface, the filter key allowing the user to filter the candidate print options to exclude some of the candidate print options from the graphical user interface.

15. The method of claim 1, wherein the graphical user interface includes a scaling mechanism, which scales an image representation, relative to a print media representation in one of the displayed print option representations, in response to a user input.

16. The method of claim 15, wherein the scaling mechanism includes at least one of a slider mechanism and a mechanism for recognizing a multi-touch gesture.

17. The method of claim 1, further comprising identifying a user-selected print option based on recognized user manipulations of the graphical user interface and outputting instructions for rendering the image based on the identified user-selected print option.

18. A computer program product comprising a non-transitory recording medium storing instructions, which when executed on a computer, causes the computer to perform the method of claim 1.

19. The system of claim 3, wherein the features of the image include dimensions and an orientation of the image.

20. A method for assisting a user in selecting a print option for rendering an image, comprising:

querying a database of print options for rendering images on different sizes of print media to identify a set of candidate print options, at least some of the print options in the database including different levels of scaling of the image from others of the print options; and generating a graphical user interface for displaying an array including representations of at least six of the candidate print options, each of the displayed representations of the print options comprising a representation of a sheet of print media with a representation of the same image, at the same scale as the representation of the print media sheet, superimposed on the representation of the print media sheet;

providing for a user to select one of the displayed representations of the candidate print options;

providing for the user to adjust a scale of the representation of the image relative to the representation of a sheet of print media in the selected one of the representations of the candidate print options; and generating instructions for printing the user-selected print option with any scale adjustment made by the user.

* * * * *